Oct. 18, 1966

A. F. REID 3,279,995

SHAPED PELLETS

Original Filed Feb. 6, 1959

INVENTOR.
ALLEN F. REID
BY
Frank G. Bower
his ATTORNEY

United States Patent Office 3,279,995
Patented Oct. 18, 1966

3,279,995
SHAPED PELLETS
Allen F. Reid, 3145 Spur Trail, Dallas, Tex.
Continuation of application Ser. No. 791,573, Feb. 6, 1959. This application May 31, 1963, Ser. No. 284,667
5 Claims. (Cl. 167—82)

This invention relates to pellets of dissociable material and, more particularly, to the geometric configuration of the pellet.

This is a continuation of my copending application Serial No. 791,573 filed on February 6, 1959, and entitled "Shaped Pellets," now abandoned.

Pellets of compositions of matter are formed into compact bodies from which the matter can be dissociated or released for various useful purposes. This release of material or dissociation has many applications which will be readily apparent to persons skilled in the practice of material release. One such application is found in the medicinal use of drugs administered orally or otherwise into an organic system. For example, in addition to oral administration, drug preparations can be implanted beneath the skin of a subject and the substance released over a period of time. Other uses of the gradual release of compositions of matter are found in the distribution of chemicals for agricultural, horticultural or other purposes in which chemical substances are needed in a continuous but gradual application. In such application of chemicals, the release of the chemicals for use may be from a pellet of suitable chemical composition which may be placed in a medium effecting the release such as a distributing flow of liquid, such as water. From this central point the composition can be distributed by gradual dissociation in the medium. For example, fertilizer in a condensed, concentrated and compact pellet form may be placed in a stream of water or other fluid which passes over and around the pellet carrying the dissociated material therefrom.

Another example of this gradual dissociation to provide release of composition of matter for use may be employed in the supply of cleaning agent in cleaning operations. A cleaning solvent, for example, may derive its cleaning agent in controlled amounts from a pellet by gradual release through dissociation. There are other examples of the gradual release of material for use found in air treatment and in various toxin distributions, such as moth prevention. In all of these operations for the gradual release of material, the active ingredient is compacted originally into a body which contains the material in a concentrated form for convenience. The composition of matter is removed from this convenient body by gradual dissociation through a chemical or physical interaction in which the material gradually parts from the main body by some mechanism and is carried away for whatever useful purpose is involved.

A problem in connection with such bodies is found in the provision and maintenance of a uniform rate of release and it is a well-recognized phenomenon that the rate of release as by dissociation of material from a central body is directly proportional to the total surface area of the body presented and available for dissociation. If the surface area changes materially during the dissociation, the rate of release is proportionally changed. For example, a cylindrical body will decrease in total volume by loss of material from all surfaces. As this decrease goes on, the proportion of the body removed takes with it substantial portions of the surface area in such a manner that the surface area eventually is decreased substantially while appreciable amounts of the body remain.

It is an object of this invention to provide a dissociable pellet having an arrangement of concave surfaces and convex protuberances which are removed from the pellet by dissociation so that the surface area of the pellet remains relatively uniform during the period of dissociation.

This and other objects will become more apparent upon consideration of the following description, taken together with the accompanying drawings in which.

A pellet is provided by this invention which is dissociable and in which the surface area remains relatively uniform during dissociation. The pellet is formed with convexities and concavities. These convexities and concavities are formed by angles between the surfaces of the solid pellet. Upon dissociation or dissolution, a convex surface, which is one having an angulation of the surfaces of less than 180°, becomes smaller in area. On the other hand, a concavity, which is an area having an angulation of surfaces which is greater than 180°, increases in area upon dissociation of the material. Accordingly, the material is uniformly removed to preserve uniform surface area. The surface area is maintained uniform during the dissociation period as the loss of surface area in the convexities is balanced by the gain in surface area in the concavities.

Figure 1:
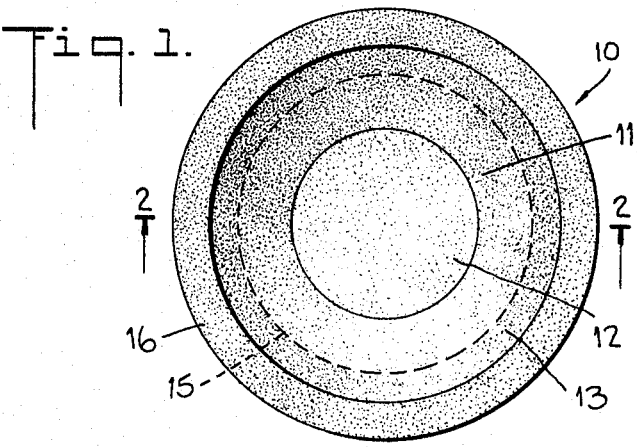
FIG. 1 is a top plan view of an embodiment of this invention in a pellet.
Figure 2:
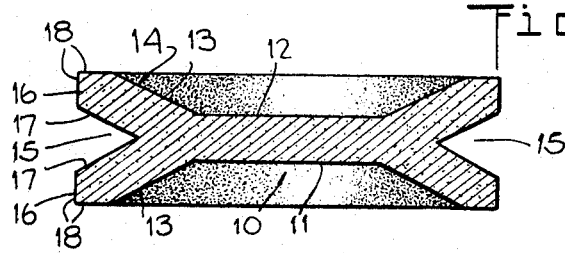
FIG. 2 is a sectional view of the pellet of FIG. 1 taken on line 2—2 of FIG. 1 in the direction of the arrows.

Referring to the figures, FIG. 1 represents a pellet 10 of suitable dissociable material. The pellet 10 is circular and contains a central concavity 11. As shown in FIG. 2, the concavities 11 on each of the sides of the pellet 10 are made up of a flat, laterally extending surface 12 and a circular area peripheral to the annular surface 13 and forming an angle of less than 180° with the surface 12. A protuberance 14 is formed outwardly of the central concavity 11. There is formed an axially thick peripheral portion 14. The peripheral portion 14 contains a peripheral concavity 15 which is notched into the peripheral portion 14. The peripheral portion 14 is formed into two flanges 16 by the peripheral concavity 15 resulting in flange shapes. Each flange is defined by one of the surfaces 17 making up the peripheral concavity 15, the respective annular surface 13 and edges 18 formed at right angles to each other at the outside of the pellet 10. Thus the pellet 10 is made up of three concavities, two central concavities 11 and one peripheral concavity 15; and it is made up of two protuberances composed of the two flanges 16. The pellet 10 has a diameter 3⅓ times its thickness. This is a typical diameter-to-thickness ratio for pellets. On dissolution, the pellet 10 loses area at the protruding flanges 16, but gains area in the concavities 11 and 15. The resultant balance maintains the surface area of the pellet substantially uniform during this progressive dissociation.

Figure 3:
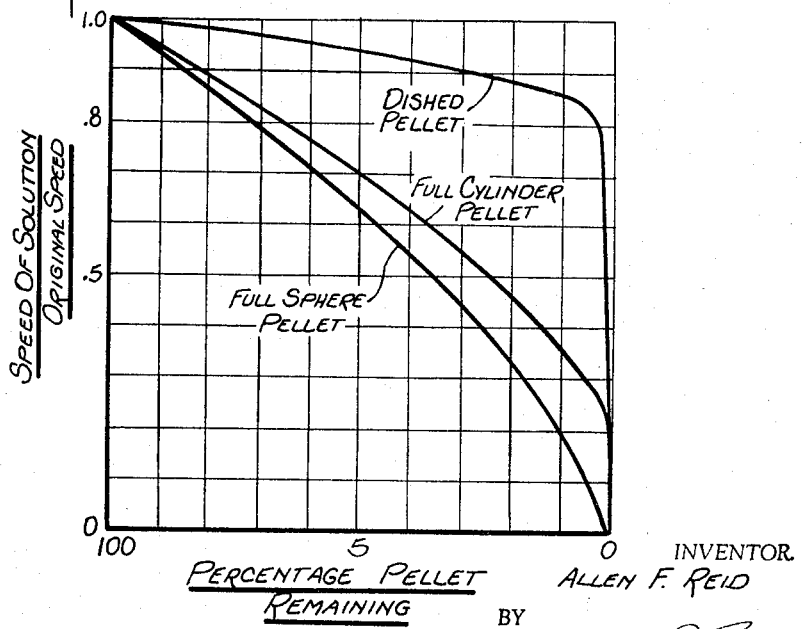
FIG. 3 is a chart showing the relationship between the rate of dissociation and the amount of the pellet remaining, comparing a pellet of this invention with conventional pellets.

This relationship is illustrated by FIG. 3. In FIG. 3 a comparison is made of the uniformity of the rate of dissolution of the pellet shown in FIGS. 1 and 2 with the rate of dissolution of a standard, full-cylinder pellet having the same diameter and thickness and with that of a spherical pellet. The ordinate of the chart in FIG. 3 represents the speed of solution from the undissolved portion of the compared pellets. The abscissa of the chart represents the amount of pellet remaining undissolved during the progressive solution of the compared pellets. It is presumed that the solution rate formed on surfaces of each pellet is uniform. This is a justifiable approximation as the rate of removal of dissolving material from the immediate vicinity of the pellet surface is sufficiently in excess of the rate of solution to be negligible in its influence upon the relative rates of solution. An examination of the chart of FIG. 3 shows that the embodiment of the invention decreases only 16% in rate of solution from the original whole body down to a complete dissolution of substantially all of the body substance. On the other hand, the rate of solution of the conventional cylinder pellet decreases 74% from the original rate of solution. In other words, the change in rate of solution for the conventional pellet is over four times as great as the change in rate of solution of the embodiment of this invention.

An essential feature of the device of this invention is an arrangement of the respective concave and convex surfaces with relation to each other. The arrangement must be so designed that the removal of material from the body surface does not destroy the nature of the concavities and convexities before the bulk of the volume has been removed from the body. In other words, the general nature of the body with its concavities and convexities must survive the removal and release of more than the major part of the total volume of the pellet. Preferably, these natures must continue to exist until the body has been completely destroyed. Further, it will be understood that the material release from the body may be by any means and is not limited to taking substances into solution by a fluid. Thus, the principles of operation apply to the erosion of the surface of a body in general and in particular manners by sublimation from the surface of the pellet or sputtering, vaporization into a vacuum or removal in any manner at all in which the removal is from the surface in such a way that the rate of release is related to the area of the surface from which the release is taken.

It will be understood that various modifications of this invention are possible and that the described embodiment set forth above is presented for the purpose of illustration. Further, modified combinations of a body according to this invention with other elements may be made without destroying the operation of this invention or its application to the body containing the invention. For example, it is the practice to coat many sustained-action pharmaceutical pellets with a more rapidly dissolving layer so that an immediate effective concentration will be provided. Another variation is to provide a layer on the outside of the pellets which will not be dissolved until the pellet reaches a certain portion of the digestive tract. Another variation is to coat the outside of the pellet with a layer which is relatively pleasing to the taste. All of these and similar variations may be effected with the pellets of this invention.

It is understood that the above description is set forth for the purpose of illustration and it is intended that the invention be limited only by the scope of the appended claims.

I claim:

1. A pharmaceutical tablet of uniformly constituted dissociable solid material dissolvable in a fluid comprising a solid unperforated center portion extending generally in a plane and having continuous surfaces on opposite sides thereof, two solid unperforated flange portions formed as a single piece with said center portion and continuously extending circumferentially around said center with each flange portion extending on opposite sides of the center at an angle thereto, said flange portions each having two side surfaces and edge surface means between said side surfaces, said side surfaces being continuous and conical in shape with one of said surfaces contiguous with a respective center surface to form continuous and uninterrupted concave areas on opposite sides of said tablet, and the other of said side surfaces being continuous and uninterrupted and on the opposite side of said flange from the first side surface, the second side surfaces of a respective flange facing one another to form a V-shaped concave groove extending continuously around said tablet, said edge surface means of a respective flange peripherally engaging said side surfaces, said edge surface means decreasing in area on immersion of the tablet in a fluid and said concave surfaces and said concave groove increasing in area to offset the loss of dissolving surface and maintain the rate of dissolution substantially constant.

2. A pharmaceutical tablet as set forth in claim 1 wherein said side surfaces of a respective flange are parallel.

3. A pharmaceutical tablet as set forth in claim 1 wherein said edge surface means are convex.

4. A pharmaceutical tablet as set forth in claim 3 wherein each of said edge surface means comprises two circumferential surfaces.

5. A pharmaceutical tablet as set forth in claim 1 wherein a coating is provided around said tablet of a different composition and dissolution rate from said tablet and having substantially the same surface configuration as said tablet.

No references cited.

LEWIS GOTTS, *Primary Examiner.*

SHEP K. ROSE, *Assistant Examiner.*